US010282146B2

United States Patent
Aiba (10) Patent No.: US 10,282,146 B2
(45) Date of Patent: May 7, 2019

(54) INFORMATION PROCESSING APPARATUS, RECORDING MEDIUM, AND PROXY RESPONSE SYSTEM

(71) Applicant: KYOCERA DOCUMENT SOLUTIONS INC., Osaka (JP)

(72) Inventor: Masaaki Aiba, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 15/707,175

(22) Filed: Sep. 18, 2017

(65) Prior Publication Data

US 2018/0088877 A1   Mar. 29, 2018

(30) Foreign Application Priority Data

Sep. 28, 2016 (JP) ................. 2016-189040

(51) Int. Cl.
    *G06F 3/12* (2006.01)
    *G06F 1/32* (2019.01)
    (Continued)

(52) U.S. Cl.
    CPC .......... *G06F 3/1236* (2013.01); *G06F 1/3284* (2013.01); *G06F 1/3293* (2013.01); *G06F 3/1221* (2013.01); *G06F 3/1285* (2013.01); *G06F 3/1286* (2013.01); *H04N 1/00885* (2013.01); *Y02D 10/122* (2018.01); *Y02D 10/1592* (2018.01); *Y02D 50/20* (2018.01)

(58) Field of Classification Search
    None
    See application file for complete search history.

(56) References Cited

U.S. PATENT DOCUMENTS

2012/0069827 A1* 3/2012 Lee .................. H04W 52/0274
                                                        370/338
2013/0308642 A1* 11/2013 Kimura .................. H04L 47/25
                                                        370/392

(Continued)

FOREIGN PATENT DOCUMENTS

JP        2003-209939 A      7/2003
JP        2014-203093 A      10/2014

*Primary Examiner* — Helen Zong
(74) *Attorney, Agent, or Firm* — Li & Cai Intellectual Property (USA) Office (57) ABSTRACT

An information processing apparatus is selectively executable a normal mode or a sleep mode, the information processing apparatus including: a main controller circuit that operates in the normal mode; a sub controller circuit that operates in the sleep mode; a first communication interface capable of communicating with an external apparatus connected to a first network; and a second communication interface capable of communicating with a proxy response device, the proxy response device being unconnected to the first network. In the sleep mode, the sub controller circuit receives a request from the external apparatus via the first communication interface, sends the request to the proxy response device via the second communication interface, receives a response to the request from the proxy response device via the second communication interface, and sends the response to the external apparatus via the first communication interface.

8 Claims, 7 Drawing Sheets

(51) Int. Cl.
  *G06F 1/3234* (2019.01)
  *G06F 1/3293* (2019.01)
  *H04N 1/00* (2006.01)

(56) References Cited

U.S. PATENT DOCUMENTS

| | | | |
|---|---|---|---|
| 2014/0293342 A1 | 10/2014 | Tsutsumi | |
| 2015/0116749 A1* | 4/2015 | Sasadai | H04N 1/00891 358/1.13 |
| 2015/0237227 A1* | 8/2015 | Saisho | H04N 1/00875 348/77 |

* cited by examiner

INFORMATION PROCESSING APPARATUS, RECORDING MEDIUM, AND PROXY RESPONSE SYSTEM

CROSS REFERENCE TO RELATED APPLICATION

This application claims the benefit of Japanese Priority Patent Application JP 2016-189040 filed Sep. 28, 2016, the entire contents of which are incorporated herein by reference.

BACKGROUND OF THE INVENTION

1. Field of the Invention

The present disclosure relates to an information processing apparatus selectively executable a normal mode in which a main controller circuit operates and a sleep mode in which a sub controller circuit operates, a non-transitory computer readable recording medium that records a program, and a proxy response system.

2. Description of Related Art

There is known a proxy response device that, when an information processing apparatus is in a sleep (energy-saving) mode and there is a request to the information processing apparatus in a network, responds (answers) to a requestor external apparatus as a proxy for the information processing apparatus.

SUMMARY OF THE INVENTION

It is desirable to improve reliability of a proxy response from a viewpoint of energy-saving of an information processing apparatus.

According to an embodiment of the present disclosure, there is provided an information processing apparatus, the information processing apparatus being selectively executable a normal mode or a sleep mode, the information processing apparatus including:
 a main controller circuit that operates in the normal mode, the main controller circuit including a first processor and a first memory that stores a first information processing program;
 a sub controller circuit that operates in the sleep mode, the sub controller circuit including a second processor and a second memory that stores a second information processing program;
 a first communication interface capable of communicating with an external apparatus connected to a first network; and
 a second communication interface capable of communicating with a proxy response device, the proxy response device being unconnected to the first network, in which
 when the second processor of the sub controller circuit executes the second information processing program in the sleep mode, the second processor of the sub controller circuit
  receives a request from the external apparatus via the first communication interface,
  sends the request to the proxy response device via the second communication interface,
  receives a response to the request from the proxy response device via the second communication interface, and
  sends the response to the external apparatus via the first communication interface.

According to an embodiment of the present disclosure, there is provided a non-transitory computer readable recording medium that records an information processing program executable by an information processing apparatus,
 the information processing apparatus being selectively executable a normal mode or a sleep mode,
 the information processing apparatus including
  a main controller circuit that operates in the normal mode,
  a sub controller circuit that operates in the sleep mode,
  a first communication interface capable of communicating with an external apparatus connected to a first network, and
  a second communication interface capable of communicating with a proxy response device, the proxy response device being unconnected to the first network,
 the program causing a processor of the sub controller circuit, in the sleep mode, to:
  receive a request from the external apparatus via the first communication interface;
  send the request to the proxy response device via the second communication interface;
  receive a response to the request from the proxy response device via the second communication interface; and
  send the response to the external apparatus via the first communication interface.

According to an embodiment of the present disclosure, there is provided a proxy response system, including:
 an information processing apparatus connected to a first network;
 an external apparatus connected to the first network; and
 a proxy response device unconnected to the first network, in which
 the information processing apparatus is selectively executable a normal mode or a sleep mode,
 the information processing apparatus includes
  a main controller circuit that operates in the normal mode, the main controller circuit including a first processor and a first memory that stores a first information processing program,
  a sub controller circuit that operates in the sleep mode, the sub controller circuit including a second processor and a second memory that stores a second information processing program,
  a first communication interface capable of communicating with the external apparatus, and
  a second communication interface capable of communicating with the proxy response device, and
 when the second processor of the sub controller circuit executes the second information processing program in the sleep mode, the second processor of the sub controller circuit
  receives a request from the external apparatus via the first communication interface,
  sends the request to the proxy response device via the second communication interface,
  receives a response to the request from the proxy response device via the second communication interface, and
  sends the response to the external apparatus via the first communication interface.

These and other objects, features and advantages of the present disclosure will become more apparent in light of the following detailed description of best mode embodiments thereof, as illustrated in the accompanying drawings.

DETAILED DESCRIPTION OF THE PREFERRED EMBODIMENTS

Hereinafter, an embodiment of the present disclosure will be described with reference to the drawings.

1. Configuration of Proxy Response System

Figure 1:
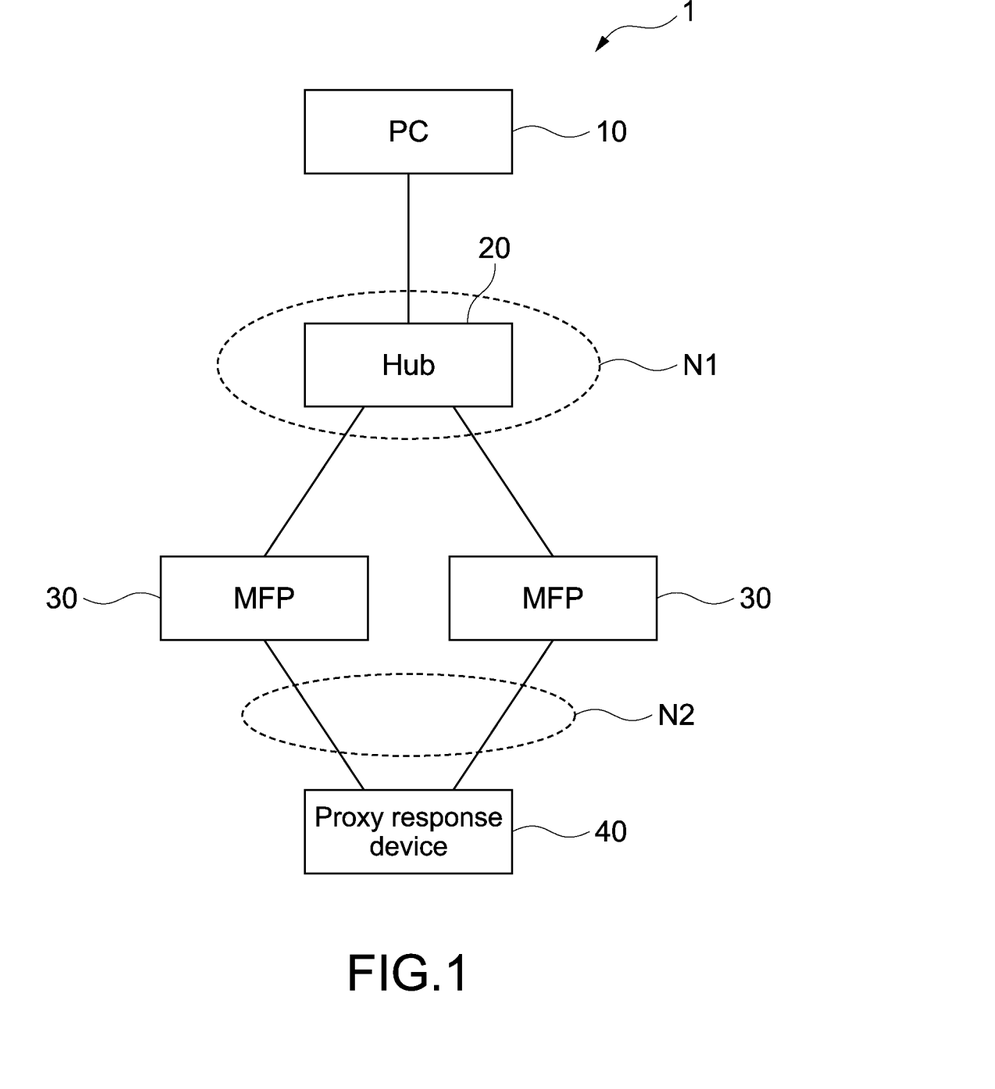
FIG. 1 shows a configuration of a proxy response system according to an embodiment of the present disclosure.

FIG. 1 shows a configuration of a proxy response system according to an embodiment of the present disclosure.

The proxy response system 1 includes the information terminal apparatus 10 (external apparatus), the hub 20, the plurality of image forming apparatuses 30 (information processing apparatus), and the proxy response device 40. The proxy response system 1 is provided in one office, typically.

The information terminal apparatus 10 is, for example, a personal computer used by a worker at the office, and will be referred to as the PC 10 (Personal Computer), hereinafter.

The hub 20 connects the information terminal apparatus 10 and the plurality of image forming apparatuses 30, and thereby builds the first network N1. The first network N1 is, for example, a wired LAN (Local Area Network), but not limited to this. The hub 20 is a switching hub.

Each of the image forming apparatuses 30 is, for example, an MFP (Multifunction Peripheral), and will be referred to as the MFP 30, hereinafter. The configurations of the plurality of MFPs 30 are similar to each other, and therefore only one MFP 30 will be described hereinafter. The MFP 30 is selectively executable a normal mode or a sleep mode. The "normal mode" of the MFP 30 is a mode in which a high-spec main controller circuit (described later) operates. The "sleep mode" of the MFP 30 is a mode in which the main controller circuit is not booted up and only a low-spec sub controller circuit (described later) operates for the purpose of energy-saving.

The proxy response device 40 is connected to the plurality of MFPs 30 via the second network N2 independent of the first network N1. In other words, the proxy response device 40 is unconnected to the first network N1. The second network N2 is, for example, a wireless LAN, but not limited to this. The proxy response device 40 outputs, when the MFP 30 is in the sleep mode, a response (answer) to a request, which is sent from the information terminal apparatus 10 to the MFP 30, as a proxy for the MFP 30.

2. Hardware Configuration of Information Terminal Apparatus

Figure 2:
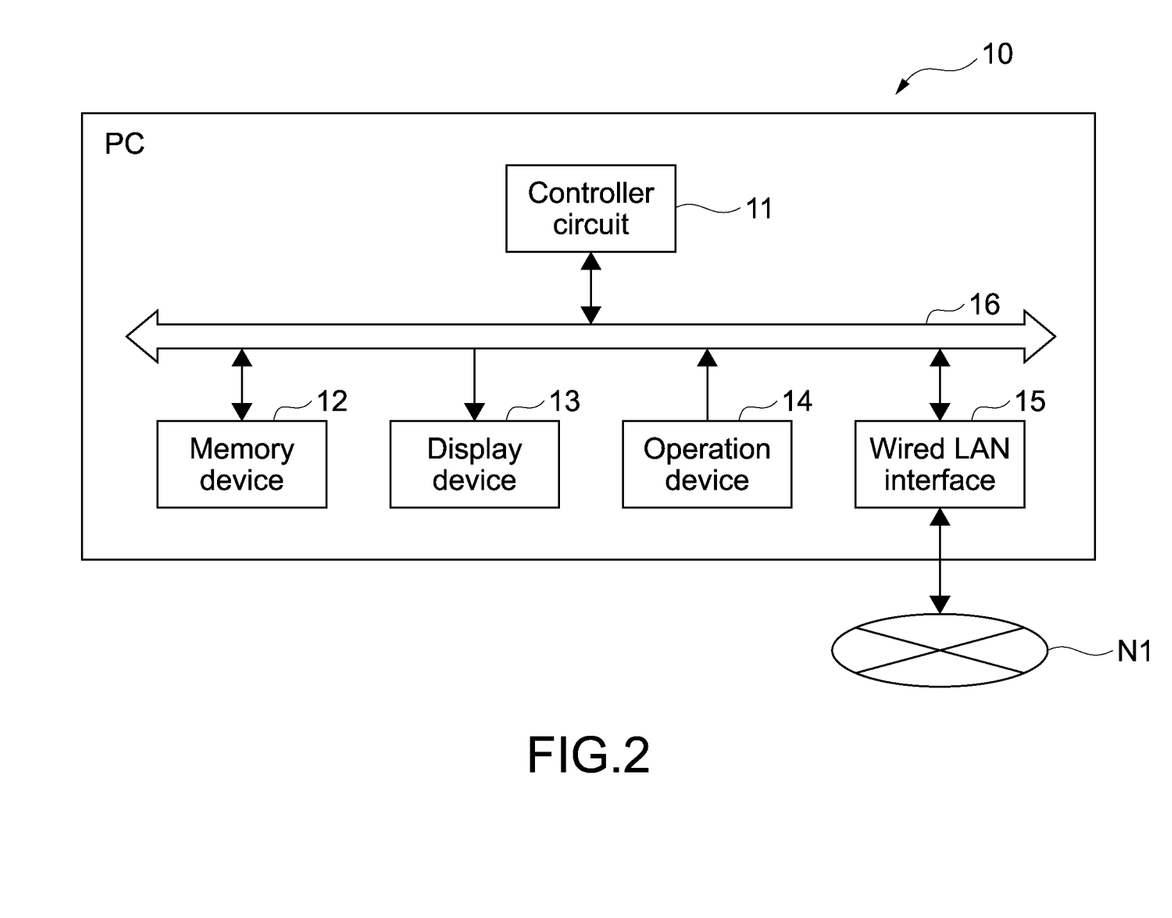
FIG. 2 shows a hardware configuration of an information terminal apparatus.

FIG. 2 shows a hardware configuration of the information terminal apparatus.

The information terminal apparatus 10 includes the controller circuit 11, and further includes the memory device 12, the display device 13, the operation devices 14, and the wired LAN interface 15 connected to the controller circuit 11 via the bus 16.

The controller circuit 11 includes a CPU (Central Processing Unit), a RAM (Random Access Memory), a ROM (Read Only Memory), a dedicated hardware circuit, and the like. The CPU of the controller circuit 11 loads a program recorded in a ROM, which is an example of a non-transitory computer readable recording medium, in the RAM and executes the program.

The memory device 12 includes a large volume memory device such as an HDD (Hard Disk Drive).

The display device 13 includes an LCD (Liquid Crystal Display), an organic EL (Electroluminescence) display, or the like. The display device 13 executes calculation processing on the basis of information received from the controller circuit 11 to thereby generate image signals, and outputs the image signals. Typically, the display device 13 is an external display device.

The operation devices 14 include a keyboard, a mouse, various switches, and the like. The operation devices 14 detect operations input by a user, and output detected signals to the controller circuit 11.

The wired LAN interface 15 is an interface for connecting to the first network N1, which is a wired LAN.

3. Hardware Configuration of Image Forming Apparatus

Figure 3:
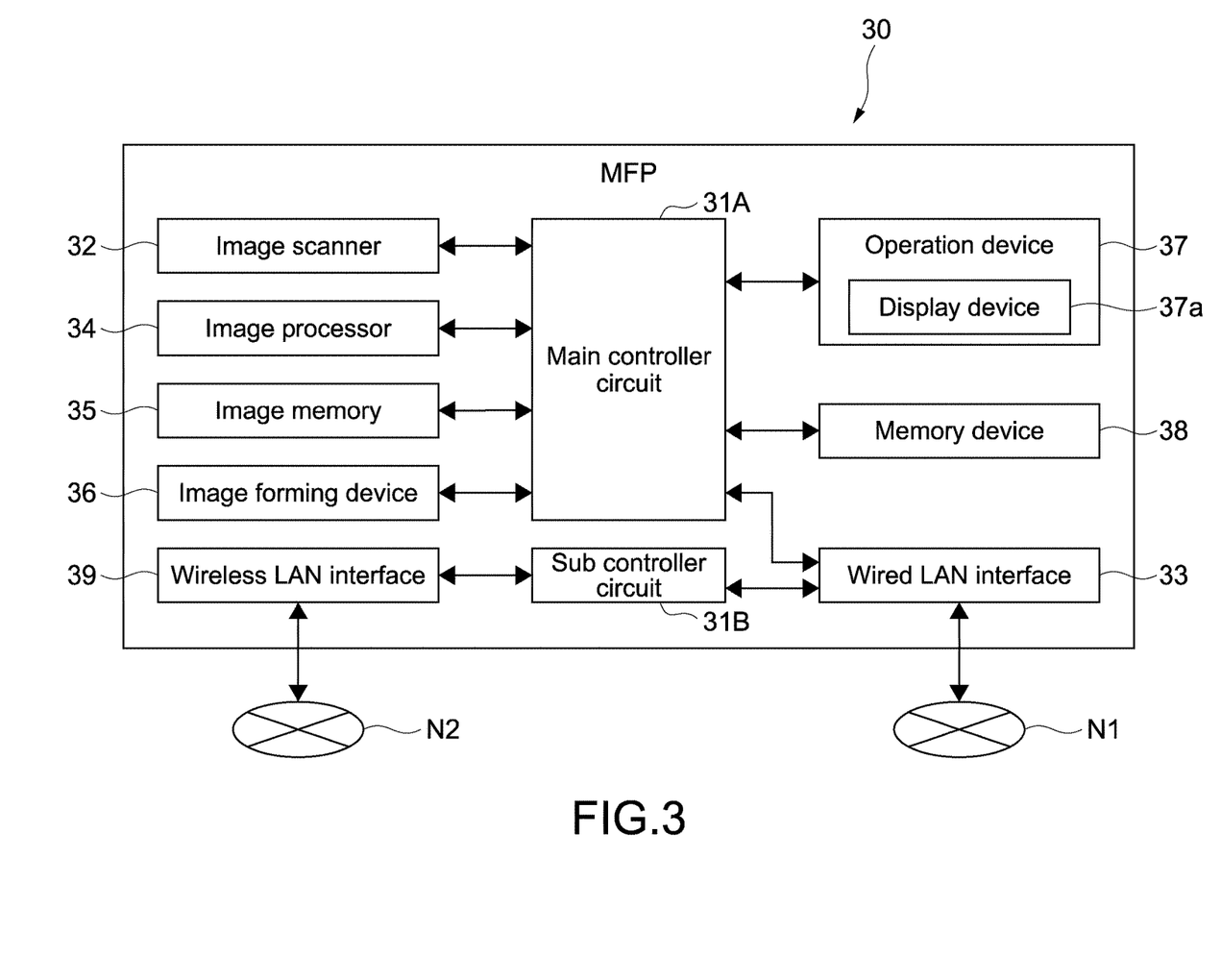
FIG. 3 shows a hardware configuration of an image forming apparatus.

FIG. 3 shows a hardware configuration of the image forming apparatus.

The MFP 30 includes the main controller circuit 31A. The main controller circuit 31A includes a CPU (first processor), a RAM, a ROM, a dedicated hardware circuit, and the like, and is a controller circuit that controls overall operations of the MFP 30. A non-transitory computer readable recording medium such as the ROM (first memory) stores a computer program (first information processing program) causing the CPU of the main controller circuit 31A to operate.

The main controller circuit 31A is connected to the image scanner 32, the image processor 34, the image memory 35, the image forming device 36, the operation devices 37, the memory device 38, the wired LAN interface 33, and the like. The main controller circuit 31A controls the operations of the above-mentioned units connected thereto, and sends/receives signals or data to/from those units.

In response to job execution instructions input by a user via the operation devices 37 or the information terminal apparatus 10, the main controller circuit 31A controls driving and processing of the mechanisms necessary to control operations of respective functions such as a scanner function, a print function, and a copy function.

The image scanner 32 captures an image of a document.

The image processor 34 as necessary processes an image of image data of the image captured by the image scanner 32. For example, the image processor 34 corrects shading of an image captured by the image scanner 32 to improve the quality of the formed image.

The image memory 35 has an area for temporarily storing document image data captured by the image scanner 32, and an area for temporarily storing data to be printed by the image forming device 36.

The image forming device 36 forms an image of image data captured by the image scanner 32, for example.

The operation devices 37 include a touch panel unit and an operation key unit that receive, from a user, instructions of various operations and processing that the MFP 30 can execute. The touch panel unit includes the display device 37a such as an LCD (Liquid Crystal Display) with a touch panel.

The wired LAN interface 33 is an interface for connecting to the first network N1, which is a wired LAN.

The memory device 38 is a large volume memory device such as an HDD for storing document images captured by the image scanner 32 and other data.

The MFP 30 further includes the sub controller circuit 31B and the wireless LAN interface 39.

The sub controller circuit 31B is a controller circuit including a CPU (second processor), a RAM, a ROM, a dedicated hardware circuit, and the like. All the processing that the sub controller circuit 31B executes includes controlling the wired LAN interface 33 and the wireless LAN interface 39 in the sleep mode of the MFP 30. Therefore it is sufficient for the sub controller circuit 31B to have a relatively low-spec CPU, a relatively low-spec RAM, a relatively low-spec ROM, and the like. A non-transitory computer readable recording medium such as the ROM (second memory) stores a computer program (second information processing program) causing the CPU of the sub controller circuit 31B to operate.

The wireless LAN interface 39 is an interface for connecting to the second network N2, which is a wireless LAN.

4. Hardware Configuration of Proxy Response Device

Figure 4:
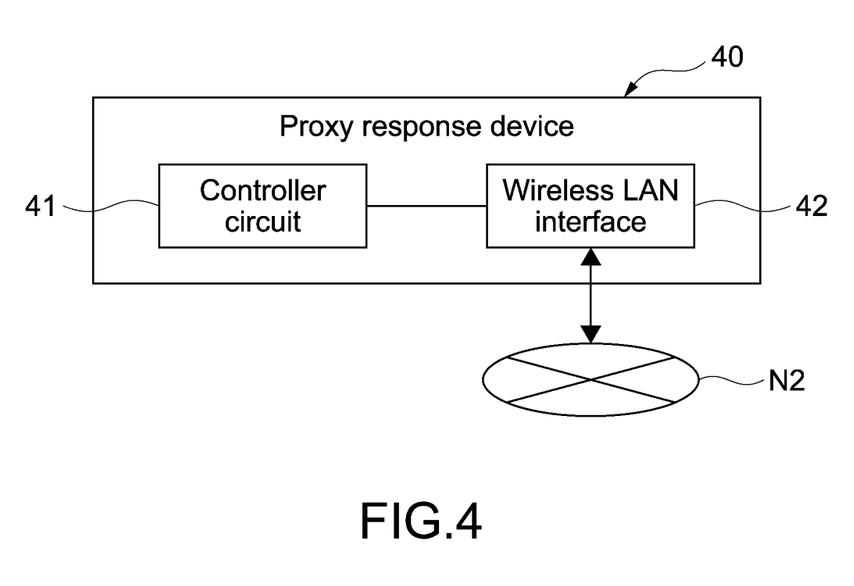
FIG. 4 shows a hardware configuration of a proxy response device.

FIG. 4 shows a hardware configuration of the proxy response device.

The proxy response device 40 at least includes the controller circuit 41, and the wireless LAN interface 42 connected to the controller circuit 41.

The controller circuit 41 includes a CPU, a RAM, a ROM, a dedicated hardware circuit, and the like. The CPU of the controller circuit 41 loads a program recorded in a ROM, which is an example of a non-transitory computer readable recording medium, in the RAM and executes the program. All the processing that the controller circuit 41 executes includes receiving a request from the MFP 30 and sending a response in the sleep mode of the MFP 30. Therefore it is sufficient for the controller circuit 41 to have a relatively low-spec CPU, a relatively low-spec RAM, a relatively low-spec ROM, and the like.

The wireless LAN interface 42 is an interface for connecting to the second network N2, which is a wireless LAN.

5. Functional Configuration of Proxy Response System

Figure 5:
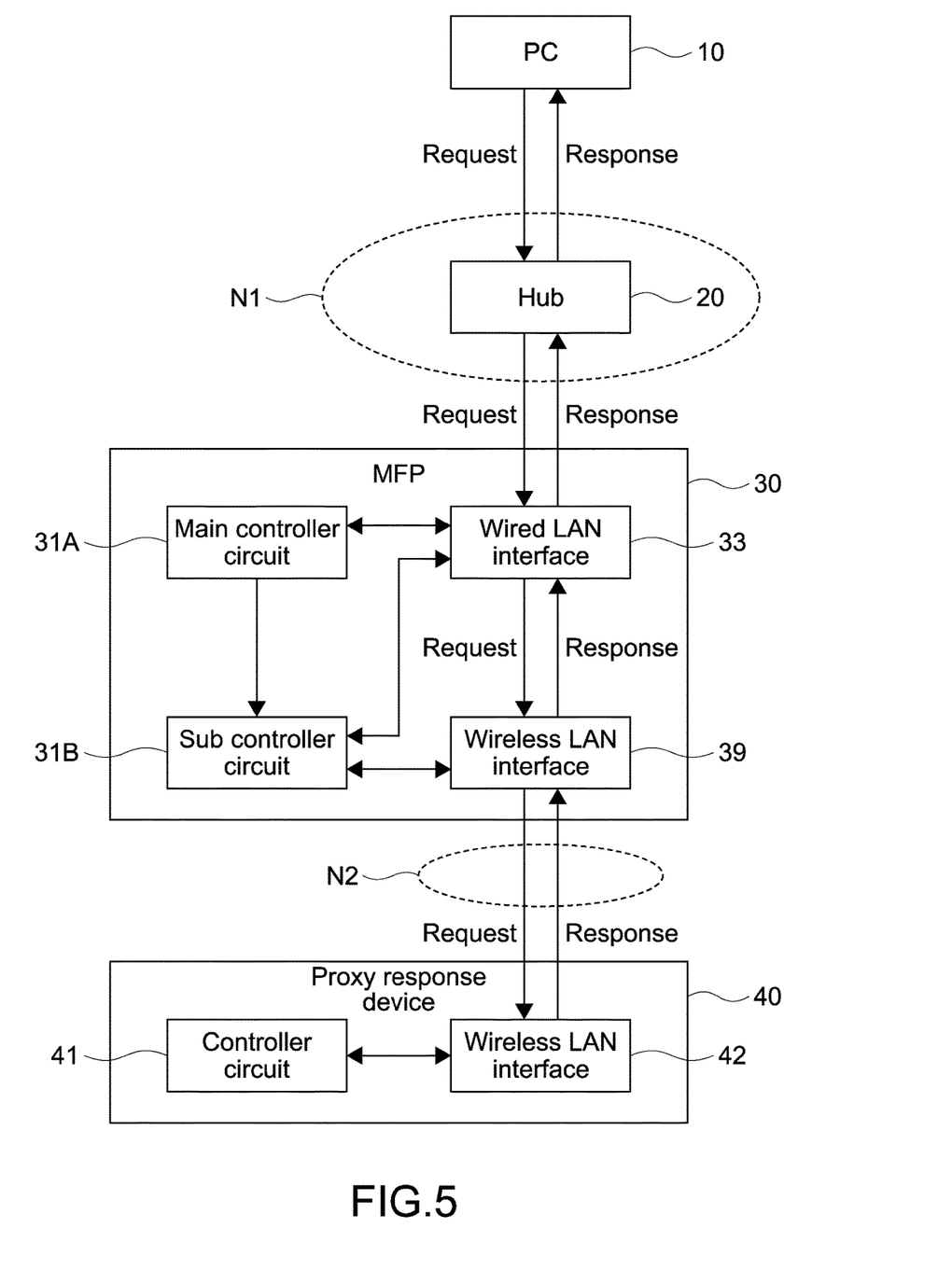
FIG. 5 shows a functional configuration of the proxy response system.

FIG. 5 shows a functional configuration of the proxy response system. FIG. 5 shows one of the plurality of MFPs 30.

The MFP 30 includes the main controller circuit 31A, the sub controller circuit 31B, the wired LAN interface 33, and the wireless LAN interface 39.

The sub controller circuit 31B operates in the sleep mode. The sub controller circuit 31B includes a second processor and a second memory that stores a second information processing program. The second processor of the sub controller circuit 31B executes the second information processing program in the sleep mode.

The main controller circuit 31A notifies the sub controller circuit 31B of transition from the normal mode to the sleep mode and recovery from the sleep mode to the normal mode.

The sub controller circuit 31B, in the sleep mode, transfers a request packet that the wired LAN interface 33 receives from the PC 10 to the wireless LAN interface 39, and transfers a response packet that the wireless LAN interface 39 receives from the proxy response device 40 to the wired LAN interface 33.

The proxy response device 40 includes the controller circuit 41 and the wireless LAN interface 42.

The controller circuit 41 creates a response packet to a request packet that the wireless LAN interface 42 receives from the MFP 30, and sends the response packet to the MFP 30.

6. Operational Flow of Proxy Response System

Figure 6:
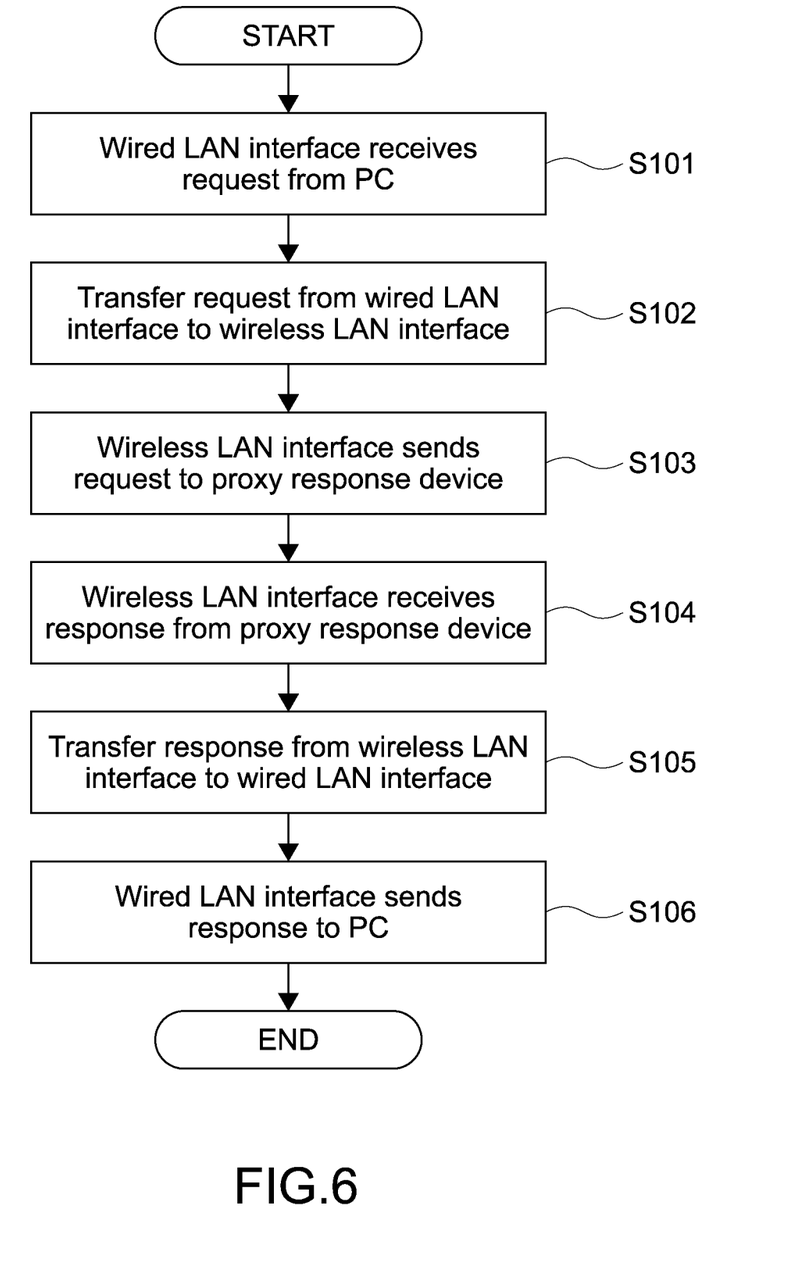
FIG. 6 shows an operational flow of the image forming apparatus.
Figure 7:
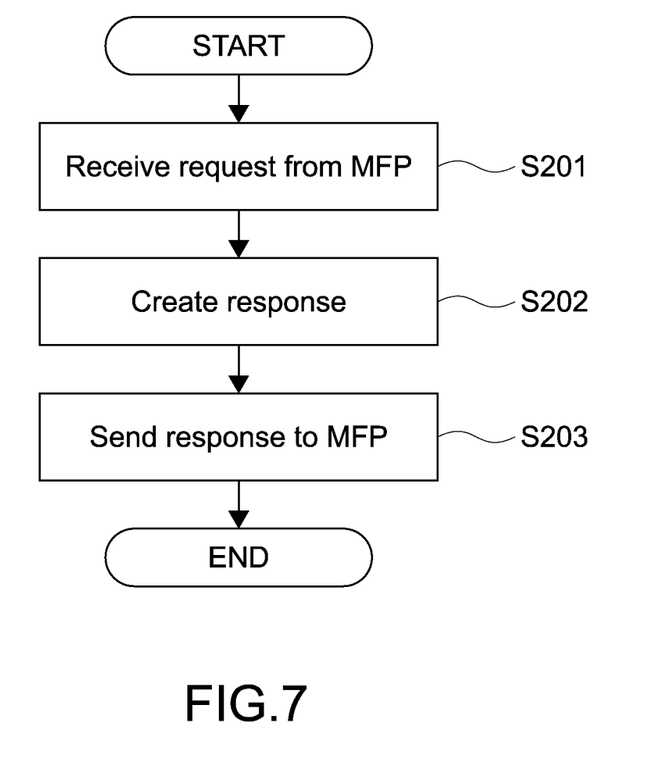
FIG. 7 shows an operational flow of the proxy response device.

FIG. 6 shows an operational flow of the image forming apparatus. FIG. 7 shows an operational flow of the proxy response device.

Before starting the flows, the MFP 30 has transited from the normal mode, in which the main controller circuit 31A operates, to the sleep mode, in which only the sub controller circuit 31B operates. The main controller circuit 31A has notified the sub controller circuit 31B of the transition from the normal mode to the sleep mode.

The wired LAN interface 33 of the MFP 30 receives a request packet from the PC 10 via the first network N1 (Step S101).

Examples of the "request packet" include an ARP (Address Resolution Protocol) packet used for resolution of a MAC (Media Access Control) address, an ICMP (Internet Control Message Protocol) packet used for notification of an error in datagram processing or notification of information on communication, an NBNS (NetBIOS Name Server) packet for resolution of a name, an LLMNR (Link-Local Multicast Name Resolution) packet for resolution of a name, an mDNS (Multicast Domain Name System) packet for resolution of a name, and the like.

The sub controller circuit 31B of the MFP 30 transfers the request packet, which is received by the wired LAN interface 33, to the wireless LAN interface 39 (Step S102). In other words, the sub controller circuit 31B only transfers the request packet, which is received from the PC 10, from the wired LAN interface 33 to the wireless LAN interface 39 simply, without analyzing the request packet. The wireless LAN interface 39 sends the request packet, which is transferred from the wired LAN interface 33, to the proxy response device 40 via the second network N2 (Step S103).

The wireless LAN interface 42 of the proxy response device 40 receives the request packet from the MFP 30 via the second network N2 (Step S201). The controller circuit 41 creates a response packet to the received request packet (Step S202). For example, where the received request packet is an ARP packet, the controller circuit 41 writes the MAC address of the MFP 30 to respond as a proxy in the received ARP packet to thereby create a response packet. The wireless LAN interface 42 sends the response packet to the MFP 30 via the second network N2 (Step S203).

The wireless LAN interface 39 of the MFP 30 receives the response packet from the proxy response device 40 via the second network N2 (Step S104). The sub controller circuit 31B transfers the response packet, which is received by the wireless LAN interface 39, to the wired LAN interface 33 (Step S105). In other words, the sub controller circuit 31B only transfers the response packet, which is received from the proxy response device 40, from the wireless LAN interface 39 to the wired LAN interface 33 simply, without creating a response packet. The wired LAN interface 33 sends the response packet, which is transferred from the wireless LAN interface 39, to the PC 10 via the first network N1 (Step S106).

Note that the proxy response is not executed when the MFP 30 is in the normal mode. The main controller circuit 31A operates in the normal mode. The main controller circuit 31A includes a first processor and a first memory that stores a first information processing program. The first processor of the main controller circuit 31A executes the first information processing program in the normal mode. Specifically, the wired LAN interface 33 receives a request packet from the PC 10 via the first network N1. The main controller circuit 31A creates a response packet to the received request packet. The wired LAN interface 33 sends the response packet to the PC 10 via the first network N1 (not shown).

7. Conclusion

When an information processing apparatus is in a sleep (energy-saving) mode and there is a request to the information processing apparatus in a network, a response (answer) is transmitted to a requestor external apparatus as a proxy for the information processing apparatus. Specific conceivable examples of such a proxy response technique are as follows.

According to a method of one conceivable example, an information terminal apparatus, an information processing apparatus being a proxy response target, and a proxy response device are connected to one hub to build one network, and the proxy response device transmits a response to the information terminal apparatus as a proxy for the information processing apparatus. However, according to this method, where the hub only stores the MAC address and the port number of the proxy response device, the proxy response device may not be capable of receiving a request from the information terminal apparatus. Further, because the route of packets in a normal mode is different from the route of packets in a sleep mode, the route of packets in the network is changed frequently, and communication troubles such as ARP flapping may occur.

According to a method of another conceivable example, a proxy response device is connected to an information processing apparatus being a proxy response target one by one to execute proxy response. However, according to this method, it is necessary to prepare one proxy response device for one information processing apparatus. Therefore where there are a plurality of information processing apparatuses, it is necessary to prepare proxy response devices of the same number, which costs much money.

To the contrary, according to the present embodiment, the sub controller circuit 31B only transfers a request packet, which is received from the PC 10, from the wired LAN interface 33 to the wireless LAN interface 39 simply, without analyzing the request packet. The sub controller circuit 31B only transfers a response packet, which is received from the proxy response device 40, from the wireless LAN interface 39 to the wired LAN interface 33 simply, without creating a response packet. Therefore it is possible to execute proxy response reliably while the sub controller circuit 31B is low-spec (i.e., cost-cutting) and energy-saving.

Further, the proxy response device 40 is unconnected to the first network N1, to which the PC 10 is connected. Further, for the PC 10, the route in the sleep mode, in which the sub controller circuit 31B receives a request from the PC 10 and sends a response to the PC 10, is the same as the route in the normal mode, in which the main controller circuit 31A receives a request from the PC 10 and sends a response to the PC 10. Therefore the PC 10 may reliably recognize a response, which is received from the MFP 30 in the sleep mode, as a response from the MFP 30, without misunderstanding that the response is a response from a different device (the proxy response device 40).

Further, where the plurality of MFPs 30 are connected to the second network N2, one proxy response device 40 may respond as proxies for the plurality of MFPs 30. Therefore the cost of the entire proxy response system 1 may be further reduced.

Further, all the processing that the sub controller circuit 31B executes includes receiving and sending a request and receiving and sending a response in the sleep mode. Therefore it is possible to further make the sub controller circuit 31B low-spec (i.e., cost-cutting) and energy-saving.

Further, the MFP 30 spends a longer time period in the sleep mode than a personal computer or the like, for example. The reliable proxy response in the sleep mode lessens the need for recovery of the MFP 30 in the sleep mode, and it is thus possible to further make the MFP 30 energy-saving.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, the information processing apparatus being selectively executable a normal mode or a sleep mode, the information processing apparatus comprising:
a main controller circuit that operates in the normal mode, the main controller circuit including a first processor and a first memory that stores a first information processing program;
a sub controller circuit that operates in the sleep mode, the sub controller circuit including a second processor and a second memory that stores a second information processing program;
a first communication interface capable of communicating with an external apparatus connected to a first network; and
a second communication interface capable of communicating with a proxy response device, the proxy response device being unconnected to the first network, wherein
when the second processor of the sub controller circuit executes the second information processing program in the sleep mode, the second processor of the sub controller circuit, during the sleep mode,
receives a request from the external apparatus via the first communication interface,
transfers the received request to the second communication interface,
sends the transferred request to the proxy response device via the second communication interface,
receives a response to the request from the proxy response device via the second communication interface,
transfers the received response to the first communication interface, and
sends the transferred response to the external apparatus via the first communication interface.

2. The information processing apparatus according to claim 1, wherein
the proxy response device is connected to a second network different from the first network.

3. The information processing apparatus according to claim 2, wherein
the first network is a wired LAN (Local Area Network), the first communication interface is a wired LAN interface,
the second network is a wireless LAN, and
the second communication interface is a wireless LAN interface.

4. The information processing apparatus according to claim 1, wherein when the first processor of the main controller circuit executes the first information processing program in the normal mode, the first processor of the main controller circuit receives a request from the external apparatus via the first communication interface, and sends a response to the request to the external apparatus via the first communication interface.

5. The information processing apparatus according to claim 1, wherein all the processing that the sub controller circuit executes includes receiving and sending the request and receiving and sending the response in the sleep mode.

6. The information processing apparatus according to claim 1, wherein the information processing apparatus is an image forming apparatus.

7. A non-transitory computer readable recording medium that records an information processing program executable by an information processing apparatus, the information processing apparatus being selectively executable a normal mode or a sleep mode, the information processing apparatus including a main controller circuit that operates in the normal mode, a sub controller circuit that operates in the sleep mode, a first communication interface capable of communicating with an external apparatus connected to a first network, and a second communication interface capable of communicating with a proxy response device, the proxy response device being unconnected to the first network, the information processing program causing a processor of the sub controller circuit, in the sleep mode, to, during the sleep mode:

receive a request from the external apparatus via the first communication interface;

transfer the received request to the second communication interface;

send the transferred request to the proxy response device via the second communication interface;

receive a response to the request from the proxy response device via the second communication interface;

transfer the received response to the first communication interface; and send the transferred response to the external apparatus via the first communication interface.

8. A proxy response system, comprising:

an information processing apparatus connected to a first network;

an external apparatus connected to the first network; and a proxy response device unconnected to the first network, wherein the information processing apparatus is selectively executable a normal mode or a sleep mode, the information processing apparatus includes a main controller circuit that operates in the normal mode, the main controller circuit including a first processor and a first memory that stores a first information processing program, a sub controller circuit that operates in the sleep mode, the sub controller circuit including a second processor and a second memory that stores a second information processing program, a first communication interface capable of communicating with the external apparatus, and a second communication interface capable of communicating with the proxy response device, and when the second processor of the sub controller circuit executes the second information processing program in the sleep mode, the second processor of the sub controller circuit, during the sleep mode, receives a request from the external apparatus via the first communication interface, transfers the received request to the second communication interface, sends the transferred request to the proxy response device via the second communication interface, receives a response to the request from the proxy response device via the second communication interface, transfers the received response to the first communication interface, and sends the transferred response to the external apparatus via the first communication interface.

* * * * *